United States Patent [19]

Graham

[11] 4,329,069
[45] May 11, 1982

[54] MANURE PIT STIRRING SYSTEM

[76] Inventor: Scott W. Graham, Gibson, Iowa 50104

[21] Appl. No.: 168,540

[22] Filed: Jul. 14, 1980

[51] Int. Cl.³ .......................... B01F 5/10; B01F 5/12; B01F 7/04
[52] U.S. Cl. .................... 366/270; 366/329; 366/330
[58] Field of Search .............. 366/262–266, 366/270, 325, 327, 329, 330

[56] References Cited

U.S. PATENT DOCUMENTS

| 134,706 | 1/1873 | Schultze | 366/262 |
| 2,991,983 | 7/1961 | Logan | 366/270 |
| 3,235,232 | 2/1966 | Conover | 366/270 |
| 3,367,583 | 2/1968 | Kellogg | 366/270 X |

FOREIGN PATENT DOCUMENTS

| 236773 | 11/1964 | Austria | 366/327 |
| 559177 | 7/1957 | Belgium | 366/262 |

Primary Examiner—Philip R. Coe
Attorney, Agent, or Firm—Zarley, McKee, Thomte, Voorhees & Sease

[57] ABSTRACT

A manure pit extends the length of a swine confinement building and includes access openings through an outside wall extending inwardly and downwardly toward the center of the pit to receive a stirring device mounted on a cart for being moved between the access openings. The stirring device includes an axial shaft in an elongated tube provided with inlet openings at the upper end of the tube for receiving liquid which is directed downwardly by propellers progressively increasing in number and volume capacity towards the bottom of the tube where it is discharged to a single outlet opening by a turbine pump. The pump includes paddles having leading edges facing in the direction of rotation of the shaft and trailing edges facing in the opposite direction. A convex upwardly bottom end plate directs the fluid radially outwardly through the outlet opening.

10 Claims, 6 Drawing Figures

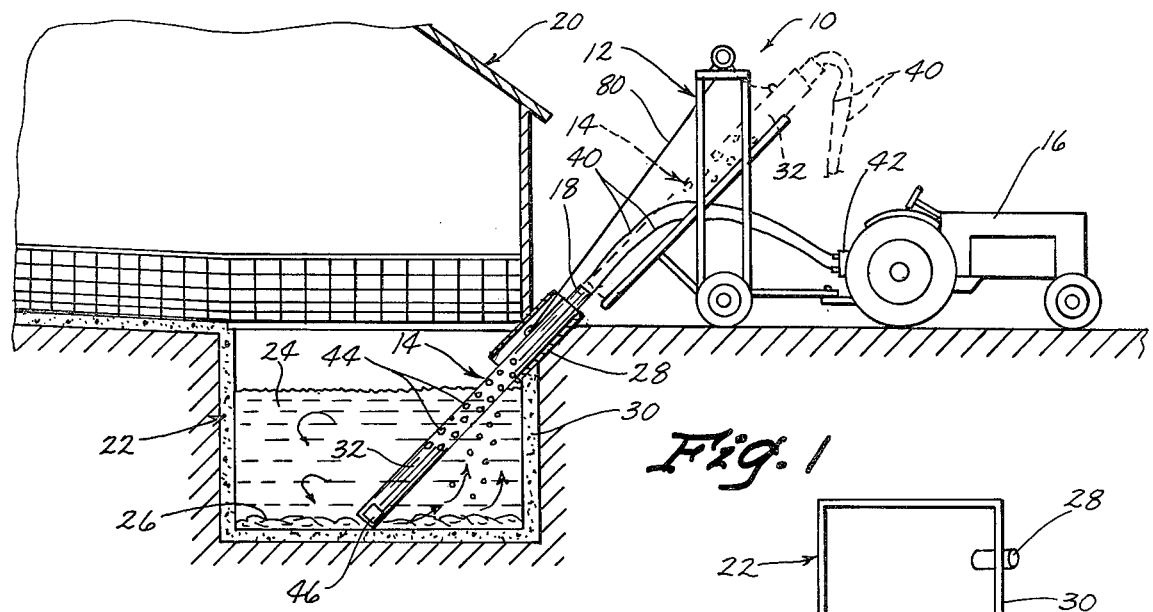
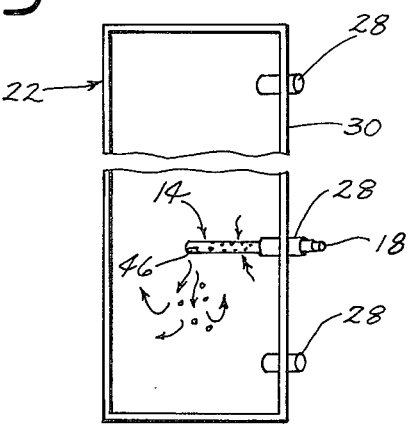
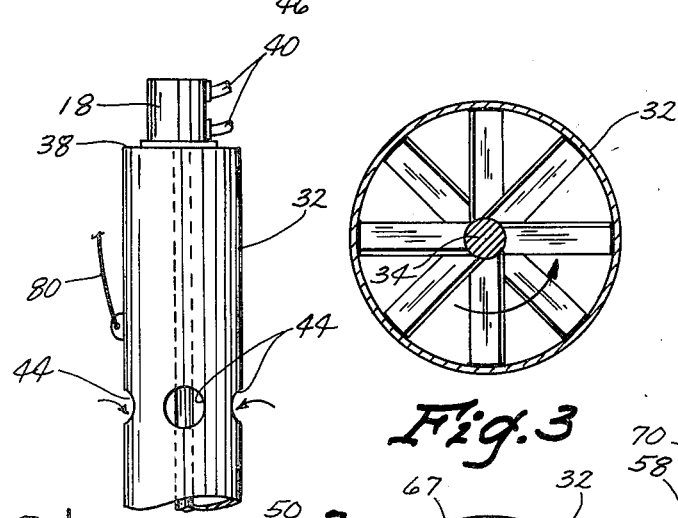
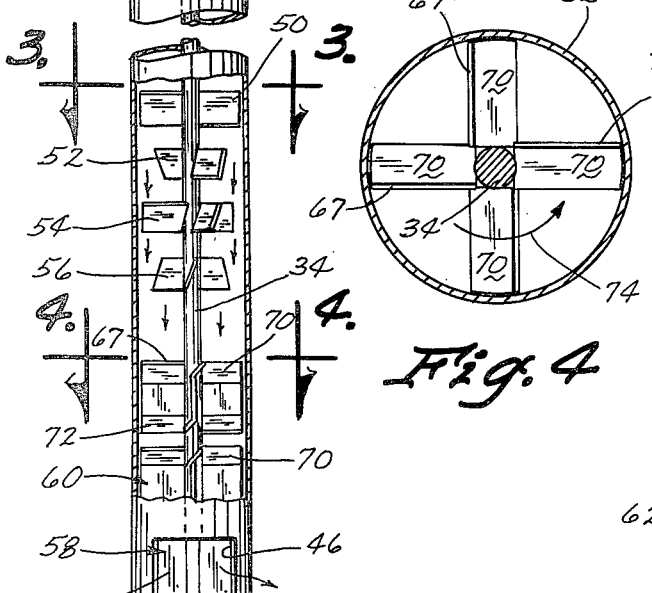
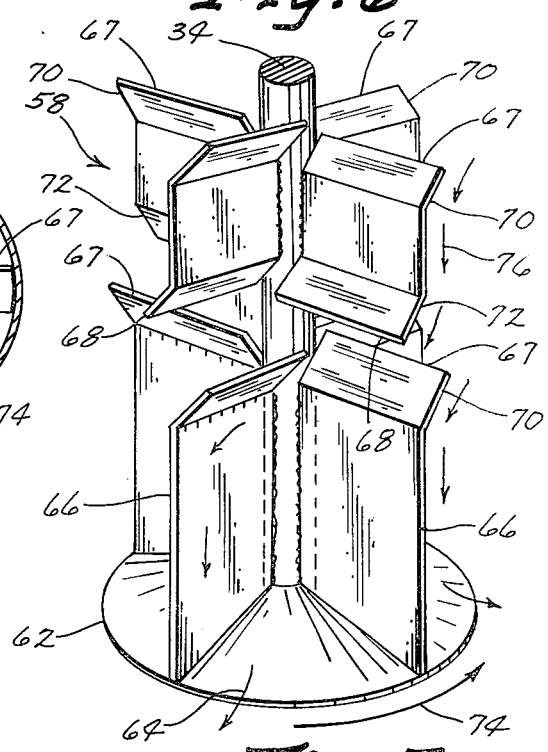

MANURE PIT STIRRING SYSTEM

BACKGROUND OF THE INVENTION

1. Field of the Invention

This invention relates to swine confinement buildings and their under-the-floor-manure pits which receive the droppings from the swine in the buildings through slatted floors. Various systems are employed for emptying the manure pits including suction pumps, however, the problem is that the solids in the pits settle to the bottom leaving the liquid at the top and making it difficult to remove the solids with suction type pumps.

2. Description of the Prior Art

The Calumet Co., Inc., Algoma, Wis. has a liquid manure pump which has an elongated tube with a pump on the lower end for pumping fluids or solids out the lower end out of the pit through the tube or away from the lower end. Liquid is not drawn in from the top from the liquid above the solids in the pit.

Other types of pumps and mixers of a general nature are available through such companies as Gelber Pumps, Chicago, Ill. and include chemical mixers for drums. None of these devices are suitable for large manure pits which require fluidizing substantial solid waste at the bottom thereof with the liquids thereabove.

SUMMARY OF THE INVENTION

The stirring device of this invention may be quickly and easily moved along the length of the pit by successively inserting it into the spaced access openings and then drawing the liquid from the top and forcing it downwardly through the stirring device tube and out the lower end. The mix of solids and liquid can be stirred a distance of approximately thirty feet in either direction at each location with the tube being turned first toward one end of the pit and then in the opposite direction. The pits may be ten feet wide by one hundred feet long. When the contents of the pit are stirred and fluidized they may be withdrawn then by conventional suction type pumps.

The particular propeller and paddle arrangement in the tube produces a progressively increasing amount of pressure and volume capacity towards the lower outlet end and a convex upwardly bottom end plate assists in directing the liquid radially outwardly.

A cart on which the stirring device is carried includes a winch for inserting the tube of the device into the access openings and withdrawing it therefrom whereupon it is moved to the next access opening into the pit.

DESCRIPTION OF THE DRAWINGS

FIG. 1 is an elevational cross-sectional view of a swine confinement building having a manure pit utilizing the stirring device of this invention.

FIG. 2 is a fragmentary elevational view of the stirring device.

FIG. 3 is a cross-sectional view taken along line 3—3 in FIG. 2.

FIG. 4 is a cross-sectional view taken along line 4—4 in FIG. 2.

FIG. 5 is a fragmentary perspective view of the paddles and turbine pump at the lower end of the stirring device.

FIG. 6 is a reduced in scale top plan view of the manure pit of FIG. 1 showing the stirring device in use.

DESCRIPTION OF THE PREFERRED EMBODIMENT

The manure pit implement of this invention is referred to generally by the reference numeral 10 and includes a cart 12 on which the stirring device 14 is carried. A tractor 16 pulls the cart 12 and powers an orbital motor 18 on the stirring device 14.

As seen in FIG. 1, a swine confinement building 20 is illustrated having a below ground manure pit 22 filled with liquid waste 24 at the top and solids 26 at the bottom. A series of access guide sleeves 28 extend inwardly and downwardly through an outside wall 30 and are adapted to receive the stirring device 14 which is movable between each of the access sleeves 28.

The stirring device 14 includes an elongaged tube 32 with an axial shaft 34 running the length thereof and driven by an orbital motor 18 at the upper end 38. Hydraulic lines 40 connect to a pump 42 on the tractor 16.

The tube 32 is provided with a plurality of inlet openings 44 positioned appropriately to receive the liquid 24 in the pit 22 and force it downwardly out a single outlet opening 46 which is intended to be positioned to face toward one end and then the other of the pit 22 as seen in FIG. 6 whereby the liquid will be pumped substantial distances on the order of thirty feet or more in each direction to stir up the solids 26 on the bottom of the pit.

A progressively increasing downward thrust generated by the stirring device 14 results from a first upper level of pair of propeller elements 50 followed by a second level pair of propeller elements 52 and then two levels of three propeller elements each at 54 and 56. A turbine pump 58 located at the bottom end 60 of the tube includes a convex upwardly end plate 62 for deflecting the liquid radially outwardly, as indicated by the arrow 64. A plurality of vertically disposed paddles 66 in the plane of the shaft 34 include leading edges 67 and trailing edges 68 on paddle portions 70 and 72, respectively, deformed out of the plane of the paddle to direct the liquid downwardly. The leading edge 67 faces in the direction of the shaft rotation, as indicated by the arrow 74, while the trailing edge 68 faces in the opposite direction. As seen in FIG. 5, the trailing edge 68 is in the close proximity of the next leading edge 67 of the next lower paddle 62 such that, as indicated by the arrows 76, the liquid is forced downwardly from one stage to the next.

In operation it is understood that prior to emptying the pit 22 using conventional equipment the liquid 24 and solids 26 will be fluidized through use of the stirring implement 10 by inserting the stirring device 14 successively into the series of access sleeves 28 positioned along the length of the pit 22 in the outside wall 30. The cart 12 will be positioned adjacent the access sleeve 28 and a winch 80 will be operated to lower the stirring device 14 into the access sleeve 28 and then to the bottom of the pit 22, as seen in FIG. 1 and in FIG. 6. The pump 18 on the stirring device 14 will be operated and the outlet opening 46 will be positioned first to force liquids through the solids along the bottom in one direction as indicated by the arrows in FIG. 6, and then the tube 32 will be turned to face the outlet opening 46 in the opposite direction such that thirty feet or more of stirring in each direction can be produced. In this manner the entire pit can be stirred fluidizing the liquid 22 with the solids 26.

I claim:

1. A manure pit having a stirring system comprising, a manure pit having spaced access openings along one side, a portable stirring device movable between said access openings and insertable therein for stirring liquid and solids in said pit, said stirring device including an elongated tube having an upper end disposable at the top of the pit and a lower end disposable in the bottom of the pit, said upper end having liquid inlet openings and said lower end having an outlet opening, and a pump in said tube for drawing liquids in said inlet openings and discharging it out said outlet opening whereby liquid drawn in at the top is pumped out into solids on the bottom of the pit thereby mixing and stirring the liquid and solids in said pit, said pump including a shaft extended axially through said tube and having blade means along its substantial length for moving said liquid downwardly from said inlet openings to said outlet opening, said blade means including a plurality of generally radially extending and circumferentially spaced-apart paddles on said shaft at the lower end of said tube, said paddles including an upright body portion and an upper portion inclined relative to said body portion and including a leading edge offset from said body portion in the direction of rotation of said shaft, and a convex upwardly end wall being positioned at the lower end of said shaft below said paddles for directing liquid in said tube radially outwardly through said outlet opening.

2. The structure of claim 1 wherein said stirring device is carried on a cart for moving it between said access openings in said one side.

3. The structure of claim 2 wherein said cart includes a winch for raising and lowering said device in said access openings.

4. The structure of claim 1 wherein said lower end of said tube is pivotable relative to said access opening for orienting the outlet opening relative to the length and width of said pit to pump liquid lengthwise of said pit.

5. The structure of claim 4 wherein said outlet opening is the only outlet opening in said tube and said lower end is pivotally movable to face said outlet openings in opposite directions longitudinally of said pit.

6. The structure of claim 1 wherein said blade means are arranged on said shaft for increasing pumping capacity towards said outlet opening.

7. The structure of claim 6 wherein said blade means includes radially extending propellers on said shaft at the upper end of said tube and said radially extending paddles on the lower end for progressively increasing the pumping capacity.

8. A manure pit having a stirring system comprising, a manure pit having spaced access openings along one side, a portable stirring device movable between said access openings and insertable therein for stirring liquid and solids in said pit, said stirring device including an elongated tube having an upper end disposable at the top of the pit and a lower end disposable in the bottom of the pit, said upper end having liquid inlet openings and said lower end having an outlet opening, and a pump in said tube for drawing liquids in said inlet openings and discharging it out said outlet opening whereby liquid drawn in at the top is pumped out into solids on the bottom of the pit thereby mixing and stirring the liquid and solids in said pit, said pump including a shaft extended axially through said tube and having blade means along its substantial length for moving said liquid downwardly from said inlet openings to said outlet opening, said blade means being arranged on said shaft for increasing in pumping capacity towards said outlet opening, said blade means including radially extending propellers on said shaft at the upper end of said tube and radially extending paddles on the lower end for progressively increasing the pumping capacity, said paddles being arranged in planes generally parallel to the axis of said shaft and including upper and lower portions disposed out of the plane of the paddle with the upper portion having a leading edge spaced from said plane in the direction of rotation of said shaft and said lower portion having a trailing edge spaced from said plane in the opposite direction.

9. The structure of claim 8 wherein a series of paddles are vertically stacked on said shaft with the trailing edge of paddles on one level being in close proximity of the leading edge on the paddles on the next lower level.

10. The structure of claim 8 wherein a convex upwardly end wall is positioned at the lower end of said shaft below the lowest level of paddles for directing liquid in said tube radially outwardly through said outlet opening.

* * * * *